Feb. 17, 1948.   V. E. MATULAITIS   2,436,072
COMBINED ACCESSORY DRIVE AND TORQUE IMPULSE NEUTRALIZER
Filed June 21, 1944   2 Sheets-Sheet 2
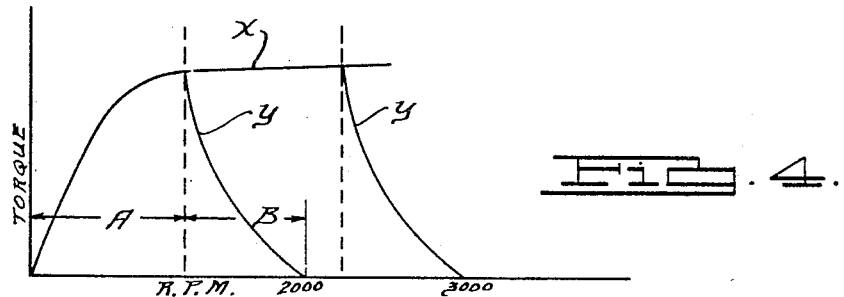
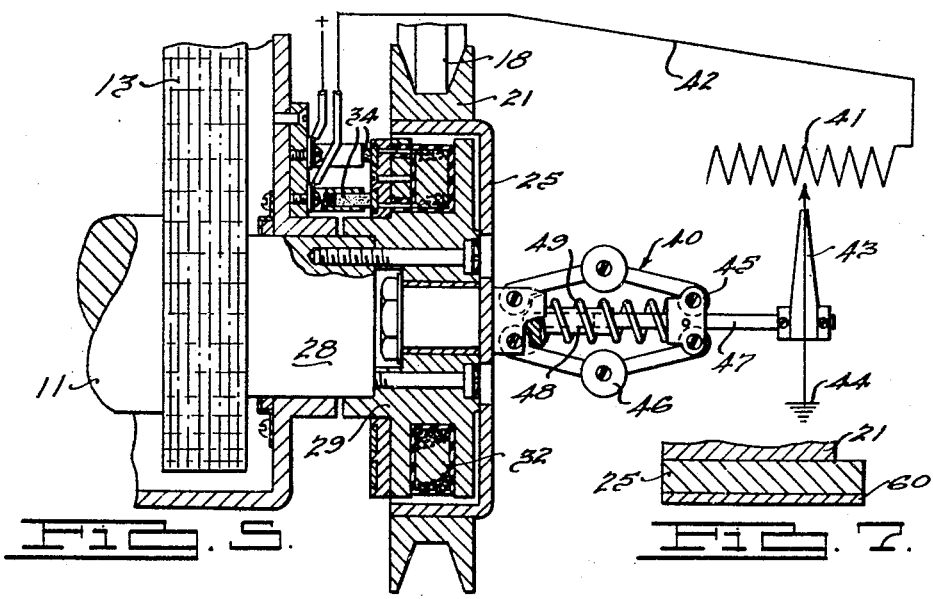
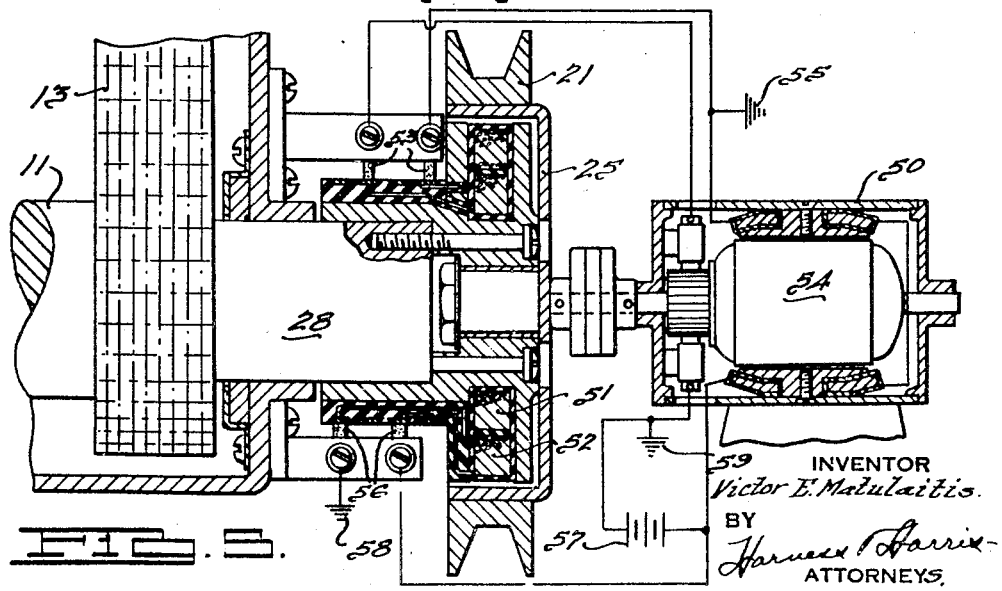
INVENTOR
Victor E. Matulaitis.
BY
Harness & Harris
ATTORNEYS.

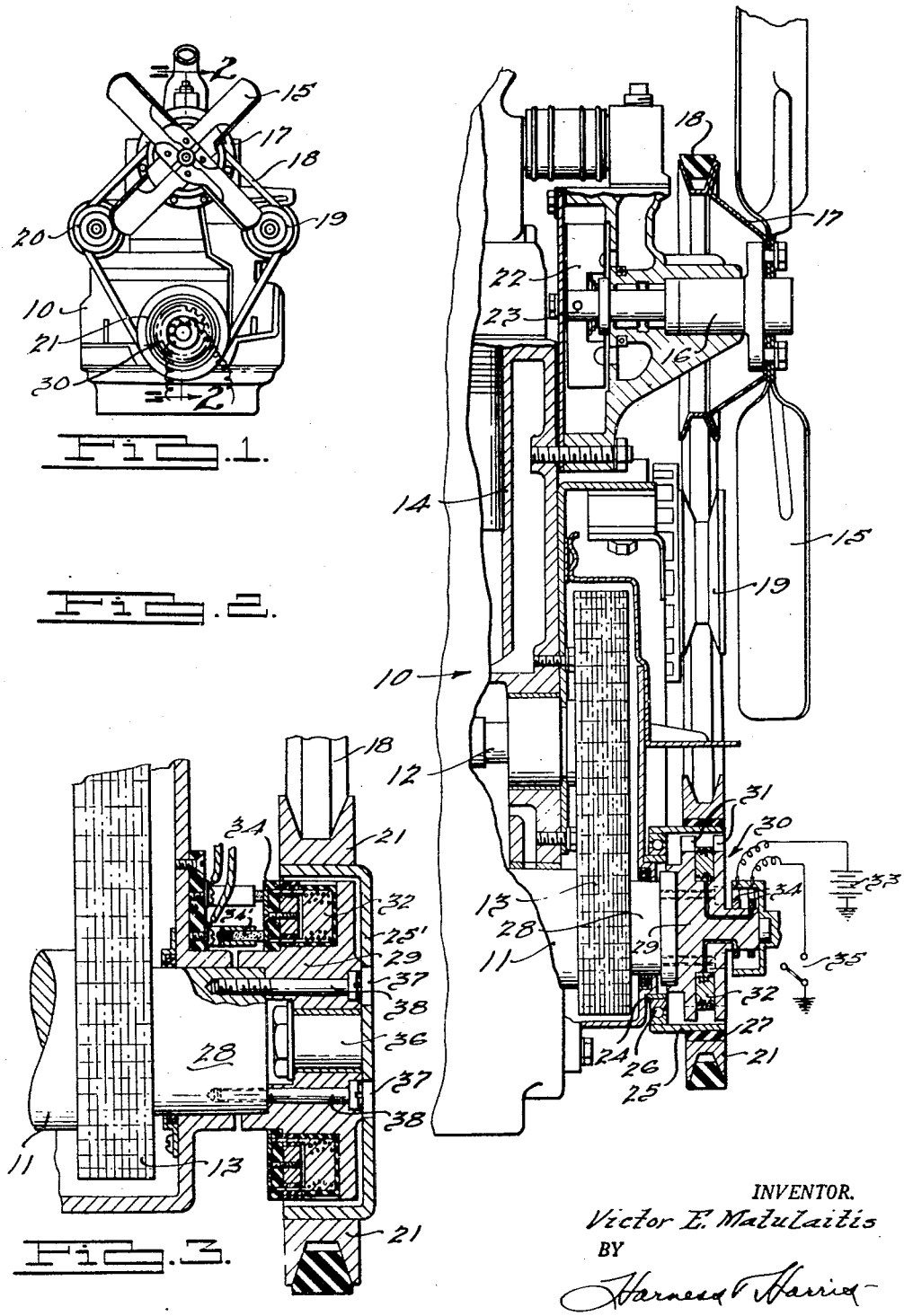

Patented Feb. 17, 1948

2,436,072

UNITED STATES PATENT OFFICE 2,436,072

COMBINED ACCESSORY DRIVE AND TORQUE IMPULSE NEUTRALIZER

Victor E. Matulaitis, Detroit, Mich., assignor to Chrysler Corporation, Highland Park, Mich., a corporation of Delaware Application June 21, 1944, Serial No. 541,443

1 Claim. (Cl. 172—284)

This invention relates to a combined accessory drive and crankshaft torque impulse neutralizer for motor vehicles and the like.

In addition to finishing power for vehicle propulsion the ordinary automobile engine must drive a number of accessories, such as the cooling fan, electrical generator, fuel pump, water pump, etc. These accessories are almost always driven by means of a belt from a pulley mounted on the forward end of the engine crankshaft. In such an arrangement, the operating speed of the respective accessories varies as the engine speed varies and this causes waste of power and fuel.

Furthermore, the design of the accessories mentioned is rendered complicated and expensive because they must deliver adequate output over a wide range of speeds. If, instead of varying in speed with the engine, the accessories could be driven at substantially constant speed, design would be simplified and economy of engine operation would be increased.

For example, the cooling fan and water pump must be of such size and be driven at such speeds that the engine temperature will be maintained within safe limits when the engine is idling with the car at rest or running at low speed. As a consequence of this, when the engine is operated at open throttle at high car speeds there is an excess of cooling capacity available which is not only unnecessary but consumes a large percentage of the horsepower developed by the engine. With proper design of the radiator and front end construction, it is possible to eliminate the cooling fan or water pump (in some instances both) at high vehicle speeds, there being sufficient air circulation induced by the motion of the car to keep the engine cool.

In some motor cars now on the road, the fan and water pump consume approximately 2% of the developed horsepower at 500 engine R. P. M. while at 2500 R. P. M. approximately 15% of the developed horsepower is consumed. A considerable portion of this increase in power is due to windage.

Similarly, the generator must be designed to deliver an adequate charging current to the battery at moderate car speeds and yet not overcharge at high speeds. The same is true of the fuel pump which will operate efficiently at much lower speeds than it is customarily driven.

It may be seen therefore that a constant speed accessory drive, or a drive that is substantially constant in speed, is desirable in an automobile both from the standpoint of fuel economy and simplification in design.

Accordingly, it is the prime object of my invention to provide a simple, cheap and efficient driving means for the accessories of an internal combustion engine.

Another object is to provide a combined accessory drive and crankshaft torque impulse neutralizer.

Other objects will appear from a reading of the following specification which describes illustrative embodiments of my invention.

In the drawings,

Fig. 1 is an elevation of the front end of an engine embodying the present invention.

Fig. 2 is a sectional view on an enlarged scale taken along the line 2—2 of Fig. 1.

Fig. 3 is a sectional view on an enlarged scale of a modified form of the invention.

Fig. 4 is a graphic representation of the speed characteristics of an engine cooling fan driven by means of the Fig. 1 apparatus.

Fig. 5 is a sectional view on an enlarged scale of a modified form of coupling.

Fig. 6 illustrates a further modification, and

Fig. 7 is a detail section of one form of coupling driven member.

Referring to Figs. 1 and 2, it will be seen that I have shown an engine 10 having a crankshaft 11, a camshaft 12, timing chain 13 and cylinder block 14. The cooling fan 15 is carried by a hub 16 which mounts a pulley 17. The latter is connected by means of a V-type belt 18 with a generator drive pulley 19, a fuel pump drive pulley 20 and a driving pulley 21 carried on a bushing 24 mounted on the engine block adjacent the forward end of the crankshaft 11.

The water pump 22 is driven by a reduced extension 23 of the fan hub 16, suitable bearing and sealing means being provided as shown.

The bushing 24 is rigidly carried on the block 14 and the pulley 21 is mounted for rotation thereon by means of an annular sleeve 25. An anti-friction bearing 26 is interposed between the sleeve and bushing and the pulley 21 is mounted on the sleeve by means of a rubber bushing 27, the purpose of which will be made clear.

Mounted on the extreme forward end 28 of the crankshaft 11 is a toothed member 29 which constitutes the driving element of an electrical eddy current coupling which is generally designated by numeral 30. The member 29 is provided with teeth 31 and a field coil 32. The latter is energized from the vehicle battery 33 through slip rings 34. A switch 35 is provided for opening the field circuit when the engine is stopped. In practice, the switch 35 may be the regular engine ignition switch or combined with the ignition switch so that it is opened when the engine is shut off.

The annular ring 25 forms the driven element of the eddy current coupling. Both the member 25 and the member 29 are formed of high permeability iron or steel and when the coil 32 is energized flux travels in a circular path around the coil, through the teeth 31 and across the air gap between the teeth and ring 25. Very little flux enters the ring 25 at points between the teeth 31 because of the relatively large air gap as compared with points in radial alignment with the teeth, therefore it is clear that there will exist in the member 25 (when member 29 is rotating) alternate regions of high and low flux density. When there is relative rotation between members 25 and 29 a point on the member 25 moves through regions of high and low flux density, thus the flux flowing through said point varies in magnitude and eddy currents are induced. These eddy currents produce an opposing flux which, in accordance with Lenz's Law, tends to oppose relative rotation between members 25 and 29.

The member 25 will therefore tend to approach the speed of the driving member 29. By proper design of the field structure of the eddy current coupling, the "slip" between the members 25 and 29 can be controlled to some extent. In the present instance, it is of course desirable that the driven member 25 rotate at substantially constant speed while the speed of the crankshaft varies in accordance with vehicle operation.

Fig. 3 illustrates a modification of the eddy current coupling wherein the driven member 25' is supported in the driving member 29 by means of an integral stub shaft 36. The shaft 36 is freely rotatable with respect to member 29 and the member 25' has openings 37 for removing the fastening bolts 38. The slip rings 34 and brushes 34' are located in rear of the coupling as shown.

Line X represents the fan torque which rapidly flattens out and remains substantially constant as the engine speed increases. Lines Y represent the torque and speed characteristics of the eddy-current coupling at different engine speeds. The distance A is therefore representative of the coupling slip at 2000 R. P. M. of the engine, and the distance B is the fan R. P. M. It may be seen from the graph that at 3000 engine R. P. M., the slip has increased proportionally and the fan speed and torque is approximately the same.

Fig. 5 shows a modified coupling which may be used in cases where better speed regulation is desired or where it is undesirable to design the coupling with a constant torque characteristic. In the Fig. 5 form, a mechanical governor 40 of the well known flyball type is driven by and with the eddy current coupling member 25. A rheostat is operably associated with the governor and is controlled thereby. For the sake of simplicity, the rheostat has been shown diagrammatically and comprises a resistance 41 which is connected to one of the brushes 34' of the coupling. An arm 43 connected to ground at 44 is carried by the movable portion 45 of the governor and is adapted to be moved across the resistance 41 to vary the amount of wire in the circuit as the flyballs 46 vary their position. The rod 47 which carries the arm 43 is slidable in the bore of the extension 48 as shown, and a coil spring 49 acts upon the movable portion 45 of the governor and urges the flyballs to their inner position.

As the speed of the coupling driven member 25 increases, the flyballs 46 tend to move radially outwardly and increase the amount of resistance in the field circuit. The field strength can thus be balanced against the torque required to drive the accessories and a constant speed drive results.

Fig. 6 shows a somewhat similar arrangement except that a small D. C. generator 50 driven by and with the coupling driven member 25 is employed in place of the governor. In this form, the coupling has two field coils, an inner coil 51 and an outer coil 52. These coils buck one another in magnetizing effect. The inner coil 51 is connected by means of brushes 53 with the armature 54 of the generator 50 and with ground at 55. The outer coil 52 is connected by means of brushes 56 with the battery 57 and with ground at 58. The generator field is grounded at 55 on one side and is connected with the battery 57 on the other. The battery and generator armature are grounded at 59.

In operation, as the speed of the coupling driven member 25 tends to increase above a predetermined maximum, the bucking action of coil 51 will reduce the effect of the coupling field coil 52 and the speed of the member 25 will remain substantially constant.

Referring back to Fig. 2, it will be seen that a rubber ring 27 is inserted between the pulley 21 and the annular ring 25. This resilient ring acts to partially absorb the torsional vibration of the crankshaft 11. The magnetic coupling effect between the members 25 and 29 of the eddy-current coupling also tends to absorb the torsional vibration of the crankshaft. In Figs. 3, 5, and 6, the rubber ring has been omitted, torsional vibrations being absorbed entirely by the eddy-current coupling.

Fig. 7 shows a section of the coupling driven member 25. The member 25 has a thin lining of copper 60 deposited on the inner surface as shown. The thickness of the layer has been exaggerated in the drawing, in practice it varies between .015 and .025 inch in thickness and may be electrically deposited, centrifugally cast or soldered in place. A squirrel cage structure of short circuited copper bars may also be used.

It may thus be seen that I have provided an extremely simple constant speed drive for automobile engine accessories which also acts as a torsional vibration damper. While I have shown several modifications of the invention for illustrative purposes, I wish it understood that my invention in its broader aspects is not limited to the precise details shown. Various changes in the size, form, and arrangement of parts will occur to those skilled in the art.

I claim:

In an accessory drive for engines a first member adapted to be driven by said engine, a second member adapted to drive said accessory, an eddy current clutch adapted to transmit drive from said first member to said second member, said clutch including a first and a second field coil carried by one of said members, an electric generator mechanically connected to said second member and adapted to be driven thereby at speeds determined by the rotation of said second member, a first means to supply electric current from an independent source to said first coil, a second means to supply substantially the entire output of electric current generated by said generator to said second coil, said first and second means and said first and second coils being adapted to assure that the magnetic fields produced by said first and said second coils oppose each other, whereby the strength of the magnetic field produced by said second coil is directly dependent upon the speeds of rotation of said driven member and said generator and the residual unopposed magnetic field produced by said first coil determines the efficiency of the slipping drive connection of said clutch so that a predetermined maximum speed of rotation of said second member is established.

VICTOR E. MATULAITIS.

REFERENCES CITED

The following references are of record in the file of this patent:

UNITED STATES PATENTS

| Number | Name | Date |
|---|---|---|
| 1,950,886 | Gunn | Mar. 13, 1934 |
| 1,976,789 | Lee | Oct. 16, 1934 |
| 2,025,487 | Winther | Dec. 24, 1935 |
| 2,255,420 | Graham | Sept. 9, 1941 |
| 704,574 | Pintsch | July 15, 1902 |
| 1,217,244 | Turbayne | Feb. 27, 1917 |
| 1,861,180 | Grob | May 31, 1932 |
| 1,982,461 | Winther | Nov. 27, 1934 |
| 2,285,246 | Winther | June 2, 1942 |

FOREIGN PATENTS

| Number | Country | Date |
|---|---|---|
| 545,975 | England | June 22, 1942 |